United States Patent [19]
Rypinski

[11] Patent Number: 5,892,796
[45] Date of Patent: Apr. 6, 1999

[54] FRAME FORMAT AND METHOD FOR ADAPTIVE EQUALIZATION WITHIN AN INTEGRATED SERVICES WIRELESS LOCAL AREA NETWORK

[76] Inventor: Chandos A. Rypinski, 655 Redwood Hwy. #340, Mill Valley, Calif. 94941

[21] Appl. No.: 644,410

[22] Filed: May 10, 1996

[51] Int. Cl.⁶ .................................................. H03H 7/30
[52] U.S. Cl. ........................................ 375/232; 364/724.2
[58] Field of Search ................................... 375/229, 232, 375/231, 211; 333/28 R; 364/724.2

[56] References Cited

U.S. PATENT DOCUMENTS 5,559,723   9/1996   Mourot et al. ........................... 375/232

Primary Examiner—Temesghen Ghebretinsae
Attorney, Agent, or Firm—Larry D. Johnson

[57] ABSTRACT

The function addressed is that of adaptive equalization to mitigate the effects of multiple path radio propagation in the context of point-to-multipoint, time division duplexed microwave radio systems. Without this equalization, fading and intersymbol interference degrades the accuracy of the recovered bit stream. This degradation of the received signal is caused by the vector sum of multiple copies of the transmitted signal arriving with various time offsets and amplitudes. The method employed uses a single training symbol per frame common for all time division multiplexed derived channels rather than one for each channel and for both up and down directions. Compensation is applied at each station transmitter rather than separately equalizing each received signal at the common receiver.

15 Claims, 5 Drawing Sheets

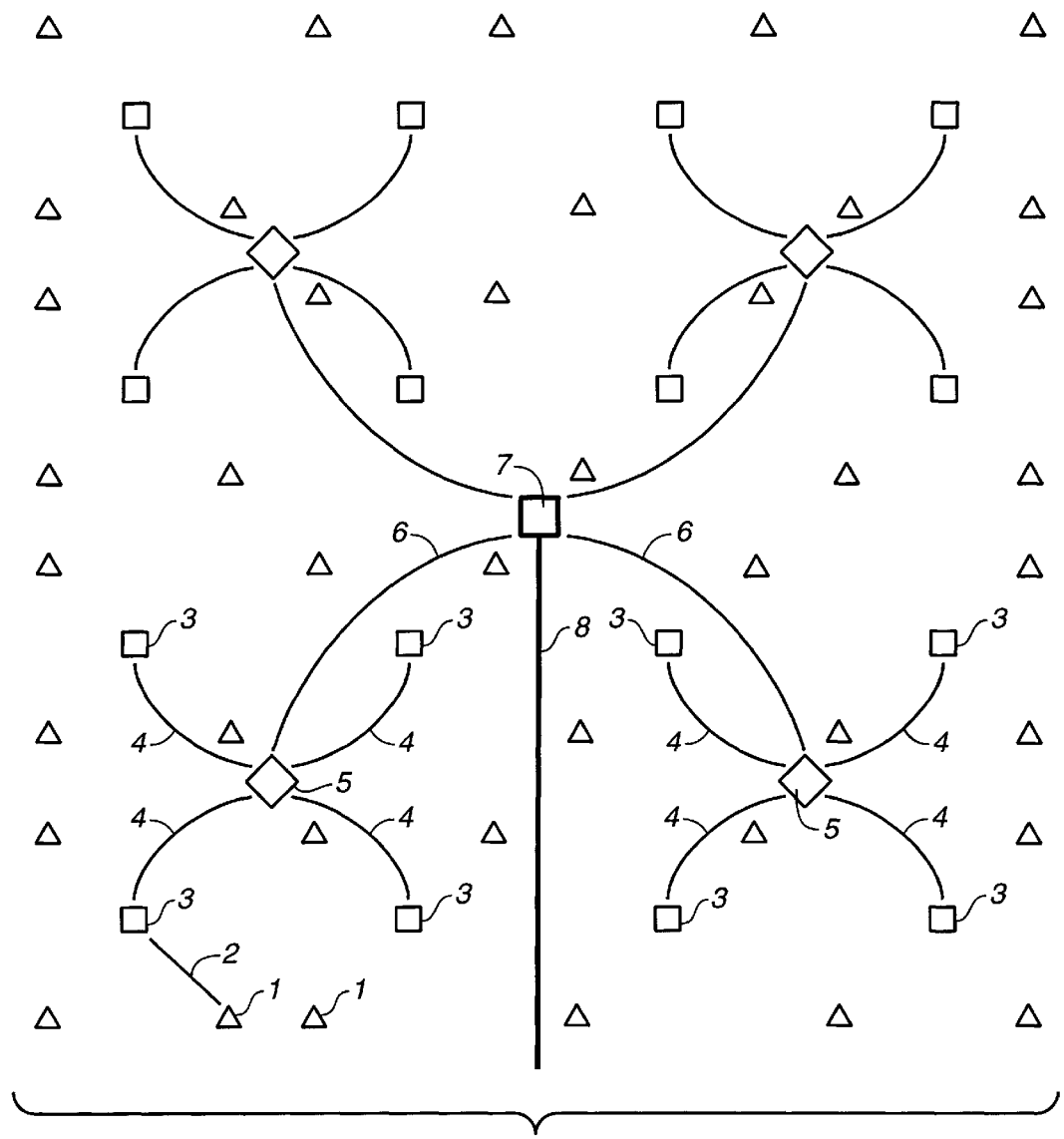
FIG._1

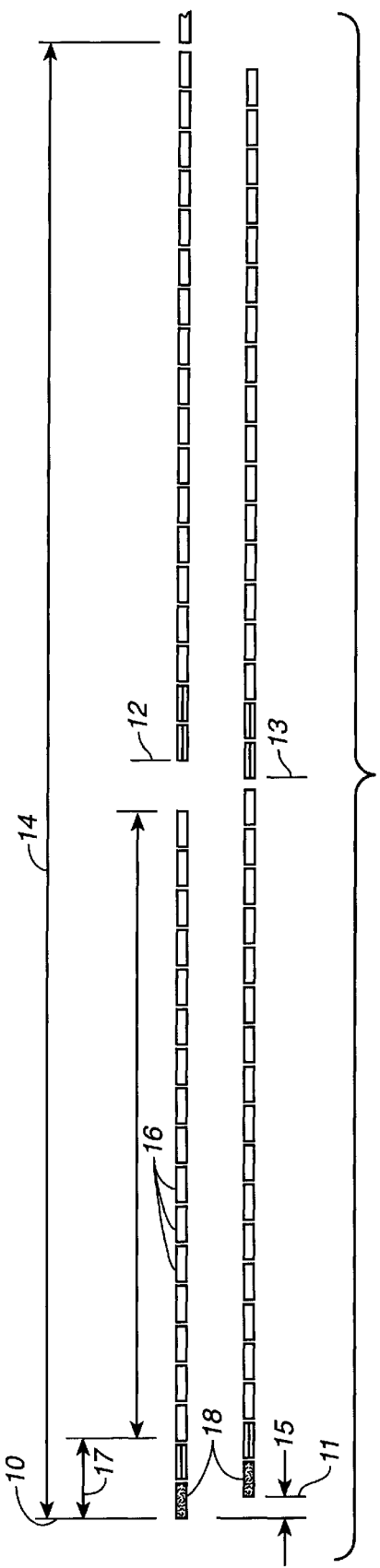
FIG._2
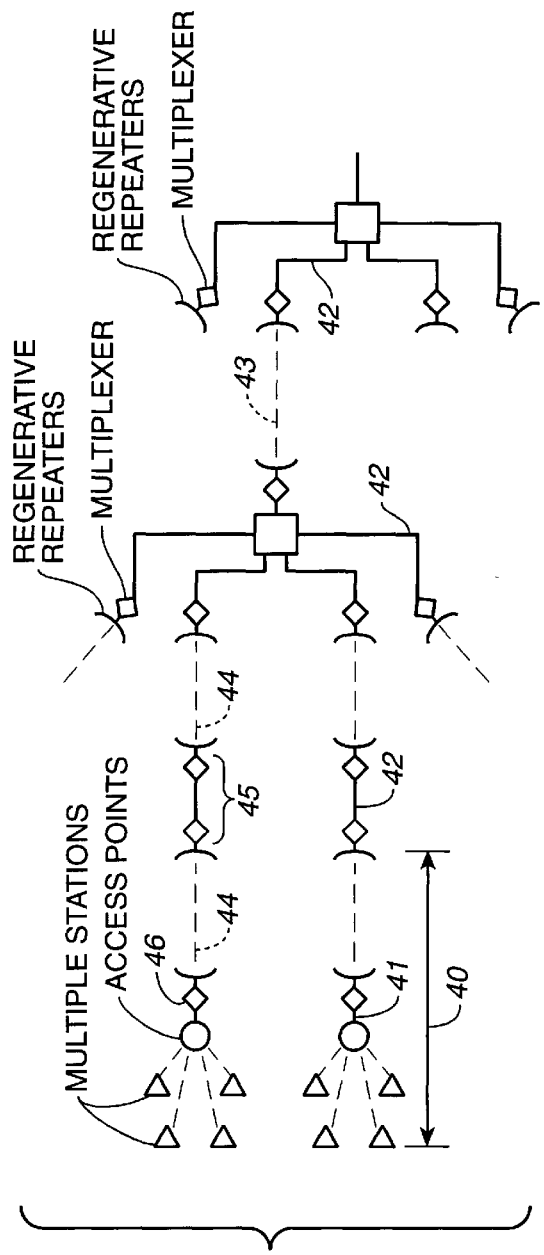
FIG._6

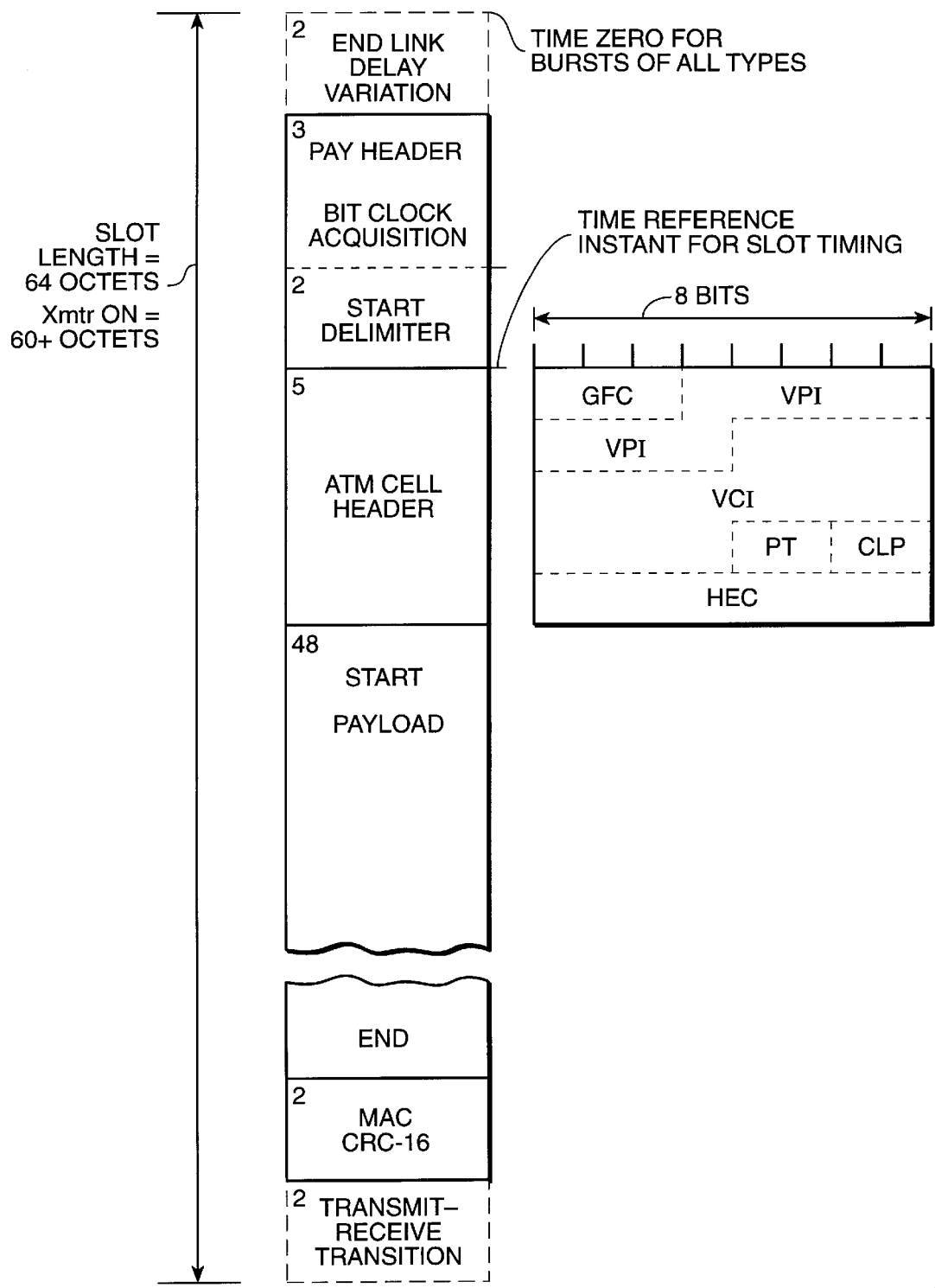
FIG._3

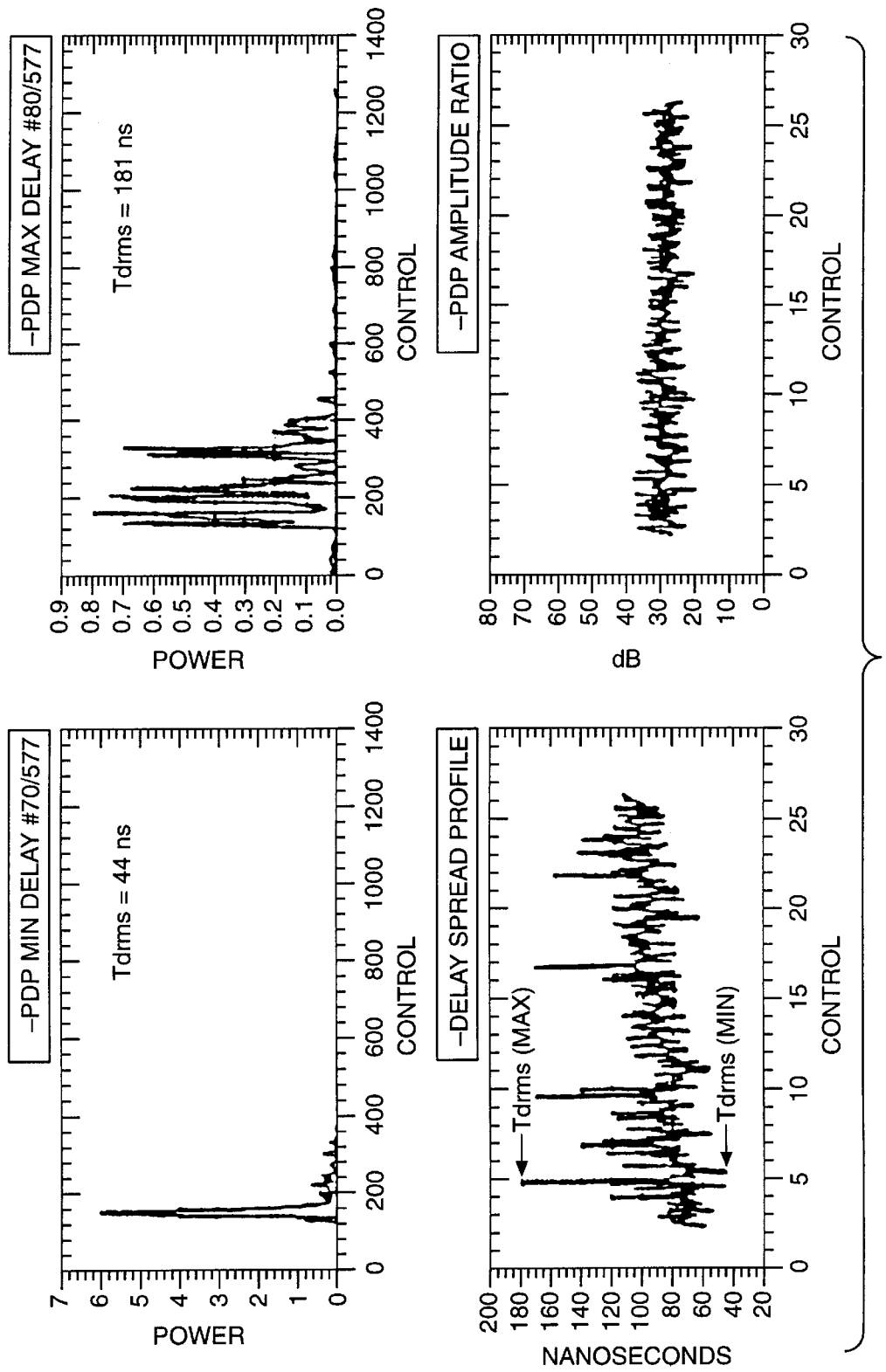
FIG._4

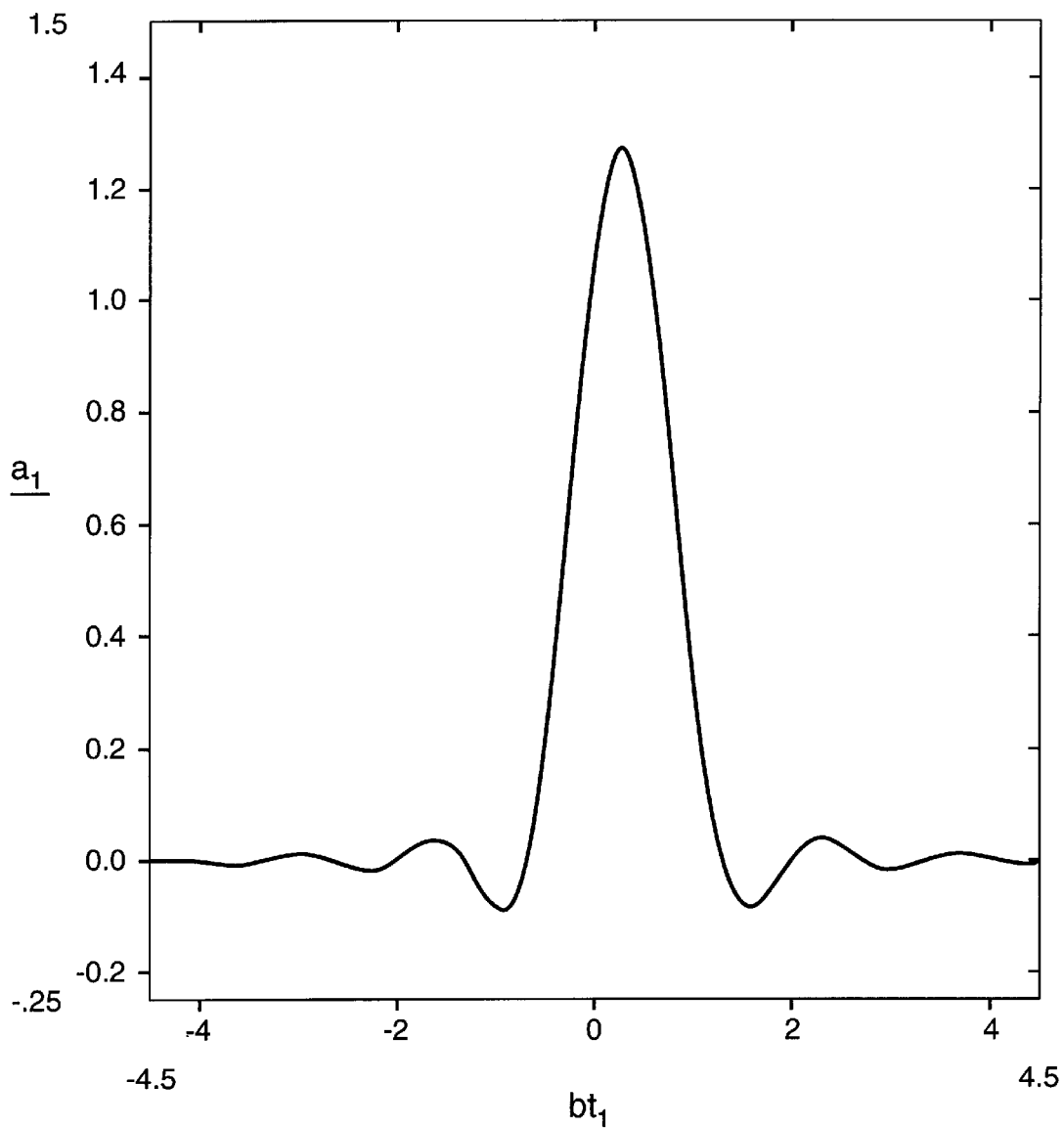
FIG._5

FRAME FORMAT AND METHOD FOR ADAPTIVE EQUALIZATION WITHIN AN INTEGRATED SERVICES WIRELESS LOCAL AREA NETWORK

BACKGROUND OF THE INVENTION

1. Field of the Invention

The function addressed is that of adaptive equalization to mitigate the effects of multiple path radio propagation within the below stated context. Without this equalization, fading and intersymbol interference degrades the accuracy of the recovered bit stream. This degradation of the received signal is caused by the vector sum of multiple copies of the transmitted signal arriving with various time offsets and amplitudes, Prior art methods are only economically applicable to point-to-point links. Such prior art methods applied to point-to-multipoint, two-way links are not only uneconomic but consume excessive channel time.

The context of this invention is radio-linked, high-data-transfer-rate communication at microwave frequencies. More specifically, the context is in the use of the radio path for communication between one fixed access point common to and serving multiple variously located user stations. The context is limited to the further subset in which time division duplex is used alternately to transmit up and down link information on a single radio channel. In this context, the radio path is identical in either direction when the same antenna is used for both transmitting and receiving; and the communication of each station is time division multiplexed on the common radio channel.

2. Description of the Prior Art

Prior art time division multiplexing requires that each station transmit in short bursts preceded by a preamble from which the receiver must condition itself for the body of the message. Time division may be with regular slots as is the case for virtually all telecom applications, or at irregular intervals as practiced in computer local area networks transferring packets. If a system must perform both of these functions, it is convenient and advantageous to have regularly periodic frames tied to the public network timing function. A reasonable choice of frame period is equivalent to 48 octets (8-bits) every 6 milliseconds to provide a virtual circuit of 64 Kbps. For voice circuits requiring only 32 Kbps, an alternative is to use only every other frame. The number 48 is the octet payload size of one cell in ATM (asynchronous transfer mode) communication.

Equalization Function

Prior art equalization occurs in the developing European Local Area Network Standard known as HIPERLAN (High Performance Local Area Network) prepared by the ETSI RES 10 Committee. In this system, each transmitted burst is at rate of 25 Mbps and begins with a "training symbol" of 480 bits that enables the destination receivers to infer the compensation necessary from the difference between the actual received signal and its known original pattern. Considerable system channel time is required for this function because it is required on every transmission regardless of its size.

From limitations on access and transfer delay across the system, it is undesirable to have long bursts. For telecom, the quantizing delay is the period of time required for the necessary number of octets to be accumulated in a buffer. For good transmission reasons, it is undesirable for this delay to exceed 12 milliseconds. With voice bandwidth compression, this number is commonly exceeded in many telephone systems, and which then require echo cancellation circuits.

One ATM cell is 53 octets or 424 bits. Several additional octets must be added for radio system overhead and acquisition preamble. It may be seen that the length of the training symbol is about the same as length of time required to transmit the useful information and logic overhead.

The prior art methods accumulate multiple cells to form longer bursts diluting down the equalization overhead. The penalty for the use of longer bursts is proportionally longer quantizing, transfer and access delay. The penalty is yet greater in prior art systems that are fundamentally peer-to-peer asynchronous (no regular frame structure), because then the training symbol must be used as well for every down link transmission in addition to every up link transmission.

Theoretical Basis

The invention uses two steps which apart from each other are prior art. The first step is measuring the impulse response of the medium. The second step is defining the transmitted pulse shape which compensates the time dispersion of the medium to provide the original pulse shape with low distortion at the destination receiver.

Impulse Response Defined Transmission Medium

A valuable reference on this subject has been provided in "Filtering in the Time and Frequency Domain" by H. J. Blinchikov and A. I. Zverev. In this reference, the following paragraph appears:

"We now have reached the amazing conclusion that a linear system with constant parameters is uniquely characterized by the single function h(t), which is the system response to an impulse function applied at t=0. It is this function that is termed the system'impulse response to an arbitrary input by the way of the convolution integral."

Barker Codes to Sound Medium and Observe Impulse Response

If the transmitted signal is a Barker code, the received signal is the impulse response of the medium with the degree of resolution and freedom from ambiguity limited by the code length. A 13-bit Barker will resolve paths arriving with one bit of time difference, and will lose accuracy from the ambiguity of response delayed longer than the 13-bit symbol. Longer codes will deal with larger amounts of time dispersion as a multiple of symbol length. The Barker is in effect a bandwidth limited pulse driver. The invention uses this information in the form of polar samples over the duration of the symbol. Averaging of repeated measurements decreases the uncertainty of these samples due to noise added in transmission. This technique is prior art.

Finite Impulse Response Pulse Shape Formation

There is art in generating the pulse shape representing the individual bits to obtain a defined and minimized frequency spectrum. To apply transform mathematics, this pulse shape must be mathematically and not empirically defined. A good pulse shape has been found to be the well known duo-binary pulse shape compressed to ⅔rds of its normal period. Each pulse, optimized for the distortionless medium, is given by equation [2] below.

$$T^2 \sin(\pi t/T)/\pi t(T-t) \text{ duobinary} \qquad [1]$$

$$(2T/3)^2 \sin(3\pi t/2T)/\pi t((2T/3)-t) \text{ compressed duobinary} \qquad [2]$$

The width of the main lobe of this pulse is spread over two bit intervals (as given by equation [2] above, rather than the three intervals of well-known duobinary pulses, as given by equation [1]). A short string of such pulses with polarity corresponding to a few different binary sequences results in a composite pattern as shown in FIG. 8 of Rypinski U.S. Pat. No. 5,388,126.

Consecutive pulses of the same sign add to a near constant dc level provided the detail of the low amplitude parts of the pulse extending a few bit intervals before and after the main lobe are taken into account. The capacity to define and generate a pulse shape extending over several bit intervals is what makes possible the use of this type of pulse shape which extends over several bit intervals and many of which must be overlaid in accordance with the data pattern. Modulations employing pulse shapes defined over plural bit intervals are referenced as "partial response" types.

The modification of this pulse shape to offset multipath time dispersion also must be made over a period of several bit intervals.

The use of Finite Impulse Response (FIR) filters to generate this and other pulse shapes is prior art. A convenient hardware method is based on shift register stepping at a sample rate which id a small integer multiple of the bit rate, where the pulse shape generated depends on the value of preceding and following bits as well as the current bits.

The impulse response is a measure of the medium. A new function must be generated which undoes the time and amplitude dispersion. This is similar to taking the pulse shown as an input and concentrating it back to the very narrow pulse that was used to generate the received shape.

Convolution and Deconvolution

These mathematical arts are described in the literature, where the functions are manipulations using the Fast Fourier Transform. The calculation of the needed wave shapes can be done with available computer applications, for example:

"Convolution and Deconvolution Convolving the impulse response of a digital filter with an input signal generates the corresponding filtered output. This document shows two ways of carrying out convolutions in MathCAD: . . . . The document also illustrates recovery of the original signal by deconvolution; you can carry out deconvolution efficiently in MathCAD by dividing the FFT of the output sequence by the FFT of the filter impulse response." "Electrical Engineering Application Pack—MathCAD," Copyright 1989 by MathSoft, Inc., One Kendall Square, Cambridge, Mass. 02139 (Page 93 of the Manual)

Station Transmit Pulse Shape

The desired transmit pulse shape is one which, after passing through the distortion introduced by the line as defined by the impulse response, produces the same pulse shape as was defined for the distortionless line.

The desired transmit pulse shape is calculated as one that a time convolution integral performed on the transmit pulse and the transmission medium impulse response produces the pulse shape defined for the distortion free medium.

This definition starts from the answer and works backward. The method of calculation uses the previously referenced deconvolution procedure.

Known Impulse Response Characteristics

In the last few years, a great deal of data has been collected on the propagation characteristics of microwave radio paths in buildings and on streets including measurements of quantities of impulse responses and their statistical evaluation. In particular NTIA-ITS (National Telecommunications and Information Administration, Institute for Telecommunication Sciences) has made high resolution polar measurements of impulse response at 1.5 Ghz in office and other environments.

The data presented includes samples of best and worst case responses, and statistical evaluation of large collections of samples vs. distance in several different environments. This kind of information is very important to the proportioning of the data rate and equalization symbol length. This data is used to characterize the problem and its numeric proportions. The data is not used in any way in the parameters of the application of the invention.

SUMMARY OF THE INVENTION

The object of this invention is to minimize the overhead for the equalization function for short data bursts whether or not they are related to ATM cells. The means used is to transmit from the shared access point a training symbol only at the beginning of each multiplexed downlink frame.

Each downlink frame is most likely to be divided into additional equal intervals of time each interval being available for one transmit burst including radio system overhead. After receiving the training symbol from the downlink frame, each station has measured the impulse response of the path between it and that access point.

The station first uses that information to demodulate the relevant parts of the rest of the frame received from the access point. The station then applies this a priori knowledge of the medium impulse response as a modification (compensation) of the shape of the uplink transmitted pulse. The access point receives the station pulses in approximately undistorted form. The assumed impulse response is refreshed once every downlink frame (e.g., every 12 milliseconds).

In the following up link transmit interval, each downstream station or repeater uses the compensation information to modify its transmitted pulse shape. All signals then arrive at the common up stream point compensated for multipath time dispersion.

The implementation methods of this invention are a combination of details known and described above as prior art.

Path Reciprocity Required

The assumed reciprocity of path impulse response is true only with a time division duplexing method where the same antenna is used for both transmitting and receiving at both ends of each link and where tight bandpass filtering at transmitters and receivers at both ends have the same transfer characteristics.

Scale Factors Applicable

The method use will be more effective when the environment results in a time dispersion of about the length of one Barker symbol or of any longer pseudo random sequence used within the training symbol. If the time dispersion is less, then the consequences of fewer alternate paths will be taken into account. If the time dispersion is greater, the responses beyond one symbol length will introduce intersymbol crosstalk as a degradation of the accuracy of the compensation. If the power content of the long delayed dispersion is small, the intersymbol crosstalk degradation will be negligible.

Movement Speed of the Receiving Point and Reflecting Objects

If the receiving point moves more than a fraction of a wavelength during a frame period, the improvement from equalization will be degraded. If a single reflecting object moves this much, there may also be a degradation.

PREFERRED FORM OF PHYSICAL IMPLEMENTATION

The invention is described in two parts. First a system function without the invention is defined which provides the basic communication functionality. Then in a second part, the modifications are described which are the implementation of the invention.

Frame Structure Before Applying Invention

The below described context is not part of the invention but is the base to which the invention is added. In a point-to-multipoint short reach radio system without the addition of this invention, a time division frame structure is setup which is in a further two parts:

1) a down link period where the access point transmits to each station consecutively and
2) an uplink period in which each station transmits to the access point in sequential order.

Each individual transmission burst consists of the following sequential parts which are the same for both up and down transfers:

1) a preamble for synchronization and acquisition of bit clock
2) a frame start delimiter
3) a header containing a virtual circuit identifier or short address and other overhead, management and CRC (cyclic redundancy character) error checking information fields (the ATM defined 5 octet header is an example satisfactory format.)
4) a payload of 48 octets if the application is ATM compatible or other lengths to suit the application.
5) an end delimiter and an optional CRC for the prior information following the header.
6) a dead time allowance for transmit receive transition and accommodation of propagation delay.

The header enables identification of the connection with which each burst is associated as contrasted with prior art systems that depend upon its time position in the sequence. The slot time allotted for each burst is slightly longer than the actual transmitter ON time.

The downlink frame consists of a management slot and a number of traffic slots. The management slot provides information on slot allocation and availability as may be needed for station to initiate communication. The same time space in the downlink frame can be used as an additional possibility for stations to request service. These functions are not part of the subject invention, but are one of several possibilities for organizing the shared use of channel time.

Frame Structure Modification to Apply the Invention

The invention adds one slot at the beginning of the downlink frame. That slot is occupied by a burst which contains an equalization training symbol with a number of known fixed binary patterns. From this pattern each receiving point observes the impulse response of the transmission medium between the access point and that particular receiver. With long equalization symbols it is possible to increase the resolution of the inferred impulse response and decrease the random uncertainty of plural samples per bit of coded information.

It may also be possible to distinguish the desired access point transmitter from others which may be receivable by color code patterns. For symmetry of up and down frame structure, an optional slot may be also added in the up link frame which would provide other useful functions; but either way, the uplink field is not part of the invention.

Added to each station is the means for applying the observed impulse response to modify the transmit pulse shape used on the associated transmitter. These functions may be accomplished at moderate speed with a "digital signal processor" and at higher speed with analog circuits.

The same method might be used between the ends of a time division duplex relay link where the repeater between the end and the relay link reproduces the information bearing bursts exactly as they are received.

The preferred period for the sum of the up and down frame is 12 milliseconds. Values of 6, 8, 16 and 24 may be applicable with different transfer delay requirements assumed. The choice of 12 milliseconds corresponds to the transmission of a 32 Kbps voice channel with one burst of 48 octets in each frame. For a 64 Kbps equivalent channel, two bursts would be required in each frame. The same result would be obtained from having a frame period of 6 milliseconds.

Each burst is separate and individually synchronized with a small channel dead time between them.

In a representative system design, the slot period is 64 octets. If the training symbol requires 60 octets, the remaining dead time is usable as all or part of a round trip delay allowance in the overall time division system.

When time division duplexing is used along with the same antenna for transmit and receive, it is possible to use one training symbol per frame rather than two for each multiplexed traffic slot (32 for the example shown). This is a great economy in the use of channel time and equipment cost.

Moreover, it is simpler and better to use the impulse response information at the point where it is received and measured, and where it can be applied to the associated transmitted signal. At the transmitting point the values of future and past bits are known facts, where at a receiving point their values are not certain and a trial assumption can only be made trailing 4 or more bits behind the current signal. This greatly complicates receiving point adaptive equalization.

BRIEF DESCRIPTION OF THE DRAWINGS

FIG. 1 Topological view of radio system showing stations repeaters, hub and hierarchy of end and relay link equipments; wherein:

(1) represents User station, 1 to 16 per end link access point, 4 trunk access, typical 16–256 places;
(2) represents User station radio path, 4 trunks;
(3) represents End link Access point with 4 trunks, typical 16 places;
(4) represents Relay link radio path with 4 trunks;
(5) represents Radio relay link repeater with 16 trunks up and 4×4 trunks down, typical 4 places;
(6) represents Higher level relay link radio path with 16 trunks;
(7) represents Intelligent Switching Hub with 4 ports each carrying 16 trunks; and
(8) represents Trunks to wide area network.

This figure shows the typical system topology in which this invention is applied to the end links between the stations and the lowest level repeater. At the center, there is an intelligent switching hub linked to access points via one or more point-to-point relay links and to the wide area network. The invention may also be applied to the relay links in addition to the multipoint end links.

FIG. 2 Radio air-interface frame structure for up and down link from hub to station for one frame with 16 traffic slots; wherein:

(10) represents Switching Hub originate—down;
(11) represents Station Receive—down;
(12) represents Switching Hub receive—up;
(13) represents Station Transmit—up;
(14) represents 12 milliseconds frame period;
(15) represents Propagation delay, one-way;
(16) represents 16 traffic slots;
(17) represents Two slots for (a) training symbol, (b) access management; and

(18) represents Added training symbol.

This diagram shows a representative frame structure into which the transmit bits are formatted. A single group with 16 traffic slots and one each management and equalization training symbol slots is shown. The invention adds the equalization symbol to the remaining prior art frame structure.

FIG. 3 Typical time allocation within a traffic slot having 64 octets duration and with 60+ octets of transmitter ON time (shown for reference only).

This diagram shows a possible format for a superset of the ATM cell with added overhead for radio system functions, but not including a training symbol for equalization of that burst. Other formats are needed for the management and training bursts. The first level definition of the ATM cell header is shown. This detail is not part of the invention, and it is shown for reference only.

FIG. 4 Sample measurements of time dispersed impulse response

This figure is copied from FIG. 8 on page 16 of contribution P802.11-92/83 to the IEEE 802.11 (Wireless Medium Access and Physical Medium Local Area Network Standards) Committee by P. B. Papazian & R. J. Achatz, "Wideband Propagation Measurements for Wireless Indoor Communication," of the National Telecommunications and Information Administration, Institute for Telecommunication Sciences (325 Broadway, Boulder Colo. 80303 USA July 1992). The power delay profiles (PDP) are shown for least and most dispersed paths and then for variations in position. The composite of these multiple paths causes fading and intersymbol interference at the receiving point unless compensated in some way. The observed time dispersion is between 44 and 181 nanoseconds in a particular part of a particular open office environment.

This figure is shown for reference only, and is not part of the invention. It is an example of the problem addressed by the invention.

FIG. 5 Isolated and compressed duobinary pulse specified for one-bit over a multi-bit interval.

This figure is a time plot of equation (2) in the prior art section above. This is not the only pulse shape that is satisfactory, but it is an example of a good one. It is shown for reference and is not part of the invention.

The time graduations of the x axis are one bit. It is inherently necessary to use a partial response time definition of the base pulse to approximate a frequency spectrum with low amplitude side lobes and steep sides for the main lobe. The same circuit techniques used for the multi-bit time definition of the transmitted pulse are equally useful for association with a multi-bit time definition of the medium impulse response.

With digital signal processing, this shape is generated by a series of samples at a typical level of 4 samples per bit. The longer the interval over which the samples extend (e.g, >5 bits), the more accurately the shape is realized.

When the shape is modified to compensate time dispersion, the new shape is wider and more complex. A time dispersive medium could require a capability to define the shape over the entire length of the measured impulse response pattern (e.g, 13 bits or 52 samples).

FIG. 6 Diagram showing repeater interfaces and representative link proportions; wherein:

(40) represents Scope of adaptive length compensation;
(41) represents Analog intermediate frequency radio interface;
(42) represents Logic level interface;
(43) represents 16 channels;
(44) represents 4 channels;
(45) represents Regenerative Repeater; and
(46) represents Linear Repeater.

This diagram shows the possibility of compensating the end link and the first relay link in tandem when the repeater function at the access point is configured as a linear repeater. The signal in all of the air interfaces and to the stations might use a 16 channel frame and time structure with only 4 channels active in the lower level relay and end links.

This diagram relates to the invention only in showing the scope of the equalization extending beyond the end link to a further relay link. The remaining parts show only context which may be quite different for systems embodying the invention.

DETAILED DESCRIPTION OF A PREFERRED EMBODIMENT

The context for this invention is described above. This detail description deals only with the equalization training symbol, its processing and applying the result of that processing to the transmitted pulse shape.

In a radio distribution system with point-to-multipoint end links as shown in FIG. 1, each radio path (2) between one station (1) and the access point (3) with which it associated will have different impulse response. The time dispersion represented by that impulse response will frequently impair the accurate recovery of a digital transmission. The means for compensation is entirely contained in the station (1) provided that the system down link includes the equalization training symbol (18) in the down link transmitted (10) and received frames (11). There is finite propagation time (15) between the transmission of the frame from the hub 7) via the repeaters (5) to the access point (3) and as received (11) at the station (1). The frame period 14) shown as 12 milliseconds is the interval between consecutive starting times of the down link subframe at the hub (7).

The frame period could have other values from 1 to 48 milliseconds representing different tradeoffs between medium signaling rate, frequency of access opportunities, transfer rate in the medium and other factors. Acceptable rates commonly integer multiples of the 125 microsecond period in telecommunication networks. With higher medium transmission rates it is possible to shorten the frame period, as an alternative to increasing the number of traffic slots. The invention is not limited to the proportions and capacities shown by these example parameters.

DESIGN OF THE DOWN LINK TRANSMITTED TRAINING SYMBOL

The training symbol may use a tandem sequence of repeated Barker patterns or other longer patterns. The principle of the invention can be wholly described using the 13-bit Barker character with the caveat that in some circumstances, a longer sequence would be better.

The number of times that the symbol is repeated is a further choice. By clocking the decorrelator at a slightly different frequency than the known transfer rate, a sweep function may be performed. Such a sweep would be a justification for a long training symbol. This is a known refinement which is not necessary for the principal of the invention to be described.

The training symbol could be 32 repetitions of the 13-bit pattern. Alternate patterns could be inverted polarity to avoid an average dc component. The compensation information is the difference between the received and expected pulse shape where the received pulse shape is averaged over multiple repetitions. This difference should be observed for at least four samples per bit interval and from the middle of the received pulse/symbol for the entire symbol from beginning to end.

An interesting extension is coding of the training symbol to separate systems with overlapping coverage. Because transmitters are normally off, any particular receiver will be monitoring an empty channel a large part of the time. The possibility is then present of hearing other transmitters from greater distances. Suppose now that a binary pattern is imposed on the training symbol by coding the polarity of each 13-bit pattern. With 32 repetitions, fully orthogonal sequences are possible with symmetrically alternating groups of 1, 2, 4, 8, 16 and 32 consecutive bits of the same sign. This is a way of providing six unique code groups to resolve such patterns. The possibilities are limited because the system depends upon a priori knowledge of the bit pattern for detection.

It is important that the expected pulse shape be clean, well defined and occupy a minimum of spectrum. This shape is the result of convolving the known duobinary pulse to the time pattern shown in FIG. 5. It may be generated with an FIR filter as described in U.S. Pat. No. 4,773,082.

The down link signal is then minimized bandwidth as it leaves the transmitter and before it is modified by multipath time dispersion.

This pulse shape may be used with either binary or parallel quadrature phased modulations. The same pulse is continued for all following data transmissions.

DESIGN AND SYNTHESIS OF THE UP LINK TRANSMITTED DIGITAL SIGNAL

The transmit pulse shape is the result of two functions. The first function is the idealized pulse for transmission over a distortionless medium, and the second function is a compensation for the amplitude and time distortion characteristics of the band-limited transmission medium to be used.

The necessary information to compensate transmission distortion is obtained from observing the difference between the received and expected pulse shape observed at the receive end of the radio down link. This difference is used as an adjustment on the constants of an FIR filter for the received signal and it is used as an adjustment on the constants of the FIR filter used to generate the transmit signal.

This process pre-distorts the transmitted pulse to obtain a near undistorted pulse at the receiving point. The transmitted spectrum from the station will be as wide as the spectrum it receives from the down link; and both of these are wider than the spectrum without dispersion that is transmitted and received at the hub radio.

IMPLEMENTATION OF THE STATION RECEIVED TRAINING SYMBOL PROCESSOR

The implementation of the hardware to operate in the fashion described is not central to the invention, however it is of great importance to the cost and development time for products which use it. The implementations picked for description are the most obvious. Other methods are possible and some may be preferable.

The DSP method below is limited to lower medium data transfer rates and narrower channels (e.g., below 4 Mbps). The current drain and speed required for quantities of digitally executed mathematics could stretch currently available technology at multi-megabit rates. The analog delay line method given below would not be easy to implement either, but it is a different set of difficulties which might be easily managed in the future.

This invention is independent of the means of circuit implementation. Those described below are first iteration possibilities.

Delay line method

The received signal could be applied to 52 tap analog delay line would represent 4 samples per bit for 13 bits. Linearly summing the taps would result in the transmitted pulse being reproduced but as modified by the distortion in the transmission medium. A serial analysis would look at the difference between the received shape and a locally generated original shape for 52 consecutive clock intervals stored as a ratio between the level observed and expected. Each result is stored in memory for many (e.g.; 30) repetitions. The results for each of the 52 positions could be averaged and then used as a correction.

For receiving the same delay line would be used but now the contribution of each tap to the summing would be multiplied by the corresponding stored value. At this point, each bit polarity is a piece of information. The summing of the taps for an output now takes into account the energy from immediately preceding and following bits. The digital information would be ascertained by the polarity of the summed pulse observed by integrating 4 consecutive samples at the summed value.

Digital signal processor method

The incoming symbol may be directly sampled with an A/D converter. The repeated answers for each sampling position could be mathematically summed, averaged and compared with the expected binary values. For each of the sample positions, a correction factor is determined during the training symbol. The results are applied to each of the sample positions before they are integrated to provide the value of the current bit.

INTERPOSED REPEATERS AND APPLICATION TO RELAY LINKS

The invention has been described above in terms of point-to-multipoint end link. As shown in FIG. 1, there may be interposed repeaters between the switching hub and the terminating station. One relay link may be characterized as a path between repeaters at an up (originating) and a down (terminating) end. Properly, the relay link consists of only half of the repeater at each end. These repeaters may be either of two types:

1) Linear: The received signal is linearly translated from one frequency to another and then amplified to transmitting level
2) Regenerative: The received signal is demodulated to logical bit level and then applied to the input of the separate transmitting system usually operating at a different channel frequency.

Linear Repeater

For the linear case, the training symbol is created at a higher level relay or hub transmitter. The fixed delay of the repeaters may be processed out, however the dispersion considered will include the dispersion of all tandem relay links. This arrangement is a possibility because the dispersion of point-to-point links is much smaller as a fraction of the optical path length. The possible reflectors must all lie close to the beam path and between the antennas. The dispersion can be much larger than the optical path length with a non-directional antenna at one end of the link. Linear repeaters probably require integrated design of both the up and down half, and that the number of channels carried and the format in which they are carried be identical to that of relayed end link.

Regenerative Repeater

For the normal regenerative case, the training symbol is created at the access point transmitter, and the equalization compensates only the end link. The access point could be extended upward by a linear repeater where the training symbol would be created and impulse response measured from the next upward regenerative repeater.

Application of Repeater Types

It is an important feature of the invention, the station implementation can be independent of the choices in the relay links. Systems can be arranged so that either type of repeater can be used. One type of repeater can be interposed in chains of the other type.

In practice, the regenerative repeater will be preferred because of the greater flexibility of logic level interconnect between links of different capacity. The linear repeater will reduce cost where it is used to collect the traffic of a few access point to a common point for further relay.

A further application of regenerative repeaters is at a point where channels from a plurality of small end link burst groups are assembled. In a hierarchical system each level needs a capacity that is the sum of the capacity of all lower level links that it forwards. The higher capacities must maintain the same frame period, and then will operate a sufficiently higher rate than the lower level links to keep a balance of in and out capacity. For this purpose logical multiplexers and demultiplexers will be necessary at higher level relay points between regenerative repeaters.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and equivalents.

What is claimed as invention is:

1. A method for adaptive equalization within a digitally modulated radio relay system having a radio path with impulse response properties for both directions of traverse from an originating end to an opposite end of a radio link, and where information is alternately transmitted as downward and upward bursts, said method comprising the steps of:

adding a training symbol short multiple octet field as a field of a transmitted down link burst preceding a data field at the originating end of the radio link;

measurement of the radio path impulse response using said training symbol from the opposite end of the radio link where that measurement is expressed as an amplitude of a plurality of samples for each of a plurality of bit intervals before and after the maximum correlation;

weighting the values of digital data in the remaining part of a received burst with said measurement at the opposite end to mitigate propagation distortion in the burst; and compensating subsequent digital data transmitted from the opposite end of the radio path to mitigate distortion introduced by the return radio path at the originating end.

2. The method for adaptive equalization within a digitally-modulated radio relay system of claim 1 where the length of a pulse field within said training symbol in time is longer than the expected time dispersion, and where said pulse field is a bit pattern with maximized correlation at a single point and with minimized side lobes for that correlation peak at all other points, said method further including the step of:

repeating said pulse field a sufficient number of times within said training symbol to dilute the uncertainty of its measurement from random noise.

3. The method for adaptive equalization within a digitally modulated radio relay system of claim 2 further including the step of increasing the number of samples to more than two samples per bit period.

4. The method for adaptive equalization within a digitally modulated radio relay system of claim 2 wherein said pulse field is taken from the group consisting of a 7, 11 or 13 bit Barker character or a Gold code.

5. The method for adaptive equalization within a digitally modulated radio relay system of claim 1 further including the step of:

polarity coding said training symbol field to enable the opposite end to ignore all training symbols received from other than the system.

6. A method for adaptive equalization within a digital radio linked local distribution system comprised of plural terminating stations associated with a common access point, and having a radio path with impulse response properties for both directions of traverse, and where short bursts of digital information are sequentially transferred down from the access point to each of the individual stations, and then sequentially up to the access point from each of the individual stations, and where said bursts are alternately transmitted first as a down link group then secondly as an uplink group and which together become a regularly periodic time division multiplexed frame, said method comprising the steps of:

adding a training symbol short digital burst as a field of a transmitted down link burst preceding a data field at the originating access point;

measurement of the radio path impulse response at each receiving terminating station using said training symbol;

weighting the values of digital data in the remaining part of a received frame at the terminating station with said measurement; and compensating subsequent digital data transmitted from that the terminating station with said measurement to mitigate distortion introduced by the return radio path when received at the access point.

7. The method for adaptive equalization within a digital radio linked local distribution system of claim 6 where the length of a pulse field within said training symbol in time is longer than the expected time dispersion, and where said pulse field is a bit pattern with maximized correlation at a single point and with minimized side lobes for that correlation peak at all other points, said method further including the step of:

repeating said pulse field a sufficient number of times within said training symbol to dilute the uncertainty of its measurement from random noise and to increase the number of samples to-more than two samples per bit period.

8. The method for adaptive equalization within a digital radio linked local distribution system of claim 7 wherein said pulse field is taken from the group consisting of a 7, 11 or 13 bit Barker character or a Gold code.

9. The method for adaptive equalization within a digital radio linked local distribution system of claim 6 wherein said access point and the terminating station are separated by one or more tandem relay links having repeaters that are linear and reproduce a received analog signal, and having radio paths that are directionally symmetric, including measurement of the radio path impulse response of the tandem and relay down links, and compensating to correct the distortion of the tandem links in the up path to the originating access point.

10. The method for adaptive equalization within a digital radio linked local distribution system of claim 7 wherein the originating access point is a regenerating repeater in which a received output is connected to a transmitting input by a logical level replica of a received digital signal, including copying a digital format for the training symbol transmitted by said regenerating repeater from that received from an upward relay link, or locally generated and inserted.

11. The method for adaptive equalization within a digital radio linked local distribution system of claim 6 further including the step of:

polarity coding said training symbol field to enable the terminating station to ignore all training symbols received from other than the system.

12. A method for adaptive equalization within a point-to-multi point digitally modulated radio relay system comprised of plural terminating stations associated with a common access point, and having a radio path with impulse response properties for both directions of traverse, and where information is alternately transmitted as a downward frame comprised of a plurality of short bursts and then an upward frame, and where each of said bursts comprises plural short groups of octets representing time division multiplexing of plural parallel independent communication channels, said method comprising the steps of:

adding a training symbol short multiple octet field as a field of a transmitted down link frame at the common originating end of the radio links from a common point;

measurement of the radio path impulse response with said training symbol at the terminating end of said radio links;

weighting the values of digital data in the remaining part of a received frame with said measurement to mitigate propagation distortion in the burst; and compensating the following digital data transmitted from that point of termination to mitigate distortion introduced by the return radio path when the signal is at said originating end of the radio link.

13. The method for adaptive equalization within a digitally modulated radio relay system of claim 12 where the length of a pulse field within said training symbol in time is generally longer than the expected time dispersion, and where said pulse field is a bit pattern with maximized correlation at a single point and with minimized side lobes for that correlation peak at all other points, said method further including the step of:

repeating said pulse field a sufficient number of times within said training symbol to dilute the uncertainty of its measurement from random noise and to increase the number of samples to more than two samples per bit period.

14. The method for adaptive equalization within a digitally modulated radio relay system of claim 13 wherein said pulse field is taken from the group consisting of a 7, 11 or 13 bit Barker character or a Gold code.

15. The method for adaptive equalization within a digitally modulated radio relay system of claim 12 further including the step of:

polarity coding said training symbol field to enable the terminating station to ignore all training symbols received from other than the system.

\* \* \* \* \*